(12) United States Patent  
Figlin

(10) Patent No.: US 7,925,977 B2  
(45) Date of Patent: Apr. 12, 2011

(54) ARCHITECTURE SOLUTION MAP BUILDER

(75) Inventor: Oleg V. Figlin, London (GB)

(73) Assignee: SAP AG, Walldorf (DE)

( * ) Notice: Subject to any disclaimer, the term of this patent is extended or adjusted under 35 U.S.C. 154(b) by 318 days.

(21) Appl. No.: 11/435,160

(22) Filed: May 15, 2006

(65) Prior Publication Data

US 2007/0266040 A1   Nov. 15, 2007

(51) Int. Cl.
*G06F 3/00* (2006.01)

(52) U.S. Cl. ......... 715/713; 715/853; 707/600; 707/603

(58) Field of Classification Search .......... 715/853, 715/705, 708, 711, 712, 713, 714, 854, 855; 705/1; 707/600, 601, 603
See application file for complete search history.

(56) References Cited

U.S. PATENT DOCUMENTS

| | | | |
|---|---|---|---|
| 6,347,303 B2 * | 2/2002 | Nagai et al. .................. | 705/7 |
| 7,350,138 B1 * | 3/2008 | Swaminathan et al. ...... | 715/234 |
| 2001/0042063 A1 * | 11/2001 | Ebert ........................... | 707/3 |
| 2003/0004746 A1 * | 1/2003 | Kheirolomoom et al. ...... | 705/1 |
| 2003/0187676 A1 * | 10/2003 | Hack et al. ................... | 705/1 |
| 2003/0195762 A1 * | 10/2003 | Gleason et al. ............... | 705/1 |
| 2004/0220910 A1 * | 11/2004 | Zang et al. ................... | 707/3 |
| 2004/0249645 A1 * | 12/2004 | Hauser et al. ................ | 705/1 |
| 2005/0021348 A1 * | 1/2005 | Chan et al. ................... | 705/1 |
| 2005/0096950 A1 * | 5/2005 | Caplan et al. ................ | 705/7 |
| 2005/0114152 A1 * | 5/2005 | Lopez et al. ................. | 705/1 |
| 2005/0154624 A1 * | 7/2005 | Hack et al. ................... | 705/7 |
| 2005/0203764 A1 * | 9/2005 | Sundararajan et al. ...... | 705/1 |

OTHER PUBLICATIONS

SAP, mySAP Overview, http://www.sap.com/businessmaps, pp. 1-12 May 2004.*

* cited by examiner

*Primary Examiner* — Weilun Lo
*Assistant Examiner* — Enrique W Iturralde
(74) *Attorney, Agent, or Firm* — Mintz, Levin, Cohn, Ferris, Glovsky and Popeo, P.C.

(57) ABSTRACT

Architecture solution maps can be generated which graphically represent an interrelation among a plurality of topics related to the deployment of software in a computing landscape. A user, when generating the architecture solution map, can define that only topics having a predefined level of relatedness are included within a rendered architecture solution map.

14 Claims, 6 Drawing Sheets

| Topic Name 310 | Description 320 | Focus Areas 330 | Type 340 | Content 350 | Comments 360 | State 370 |
|---|---|---|---|---|---|---|
| Topic 1 | ... | ... | ... | ... | ... | |
| Topic 2 | | | | | | |
| ... | | | | | | |
| Topic N | | | | | | |

| | Topic 1 | Topic 2 | ... | Topic N |
|---|---|---|---|---|
| Topic 1 | | | | |
| Topic 2 | <Number 1...10> | | | |
| ... | <Number 1...10> | <Number 1...10> | | |
| Topic N | <Number 1...10> | <Number 1...10> | <Number 1...10> | |

| Group | Level | Description |
|---|---|---|
| High Relatednesss | 1 | Topics are tightly related to each other, if you are interested in topic A, 90% probability that you will need topic B as well. Might describe close relatedness of two general areas (like Development Tools and Portal) or two tightly coupled technical issues (like Visual Composer and deploying into Portal) |
| | 2 | Topics are tightly related to each other, if you are interested in topic A, almost 80% probability that you will need topic B as well. General topics (like Portal) can be related to technical topics as well (i.e. Portal <-> Global Portal Solution ,Global Portal Solution is General topic as well but not so big like Portal since it is only one of the Portal implementation solutions) |
| | 3 | Topics are tightly related to each other, if you are interested in topic A, almost 70% probability that you will need topic B as well. |
| Medium Relatednesss | 4 | Topics are tightly related to each other, if you are interested in topic A, almost 60% probability that you will need topic B as well. |
| | 5 | Topics are tightly related to each other, if you are interested in topic A, almost 50% probability that you will need topic B as well. |
| | 6 | Topics are tightly related to each other, if you are interested in topic A, almost 40% probability that you will need topic B as well. |
| | 7 | Topics are tightly related to each other, if you are interested in topic A, almost 30% probability that you will need topic B as well. |
| Low Relatednesss | 8 | Topics are tightly related to each other, if you are interested in topic A, almost 20% probability that you will need topic B as well. |
| | 9 | Topics are tightly related to each other, if you are interested in topic A, almost 10% probability that you will need topic B as well. |
| | 10 | Topics are tightly related to each other, if you are interested in topic A, you will probably not being interested in topic B. |

FIG.8

ARCHITECTURE SOLUTION MAP BUILDER

TECHNICAL FIELD

The subject matter described herein relates to the generation of an architecture solution map for a complex software deployment.

BACKGROUND

Architecting a deployment of software implemented across a landscape of computing systems within an enterprise can be complex based on the myriad of possible configurations that may be generated. For example, implementing one or more of an internal/external portal application with security, a messaging infrastructure, a data management system, and tools to develop web services and portal content on a worldwide basis can implicate hundreds of possible configuration scenarios. As a result, narrowing down the number of possible scenarios in order to determine a final architecture that only includes relevant topics can be a lengthy and resource consuming process.

SUMMARY

User-generated input selecting a plurality of initial topics associated with a deployment of a data processing system is received. Thereafter, topics complementary to the plurality of initial topics are determined (i.e., identified) using a relationship matrix. The relationship matrix can characterize a level of relatedness among each of at least a portion of the initial topics and the complementary topics. Thereafter, a rendering of an architecture solution map is initiated. The architecture solution map is a graphical representation in which each selected topic and each complementary topic having a level of relatedness above a predetermined level are visually displayed as nodes.

The relationship matrix can be pre-defined in that levels of relatedness among each pair of a plurality of topics have already been determined. Alternatively, a user can define a level of relatedness for the various topics (and the user can also define the topics). In some variations, a relationship matrix among a plurality of available topics based on configuration information associated with a plurality of previous processing system deployments is generated and used for subsequent architecture solution maps. For example, with such an arrangement, the corresponding level of relatedness among each pair of available topics can be based on a number of previous processing systems that utilized both topics in a pair.

The architecture solution map may provide that certain nodes are grouped together. For example, the architecture solution map can be divided into two or more sections which correspond to the groupings so that only nodes within a single group are included in any section. Moreover, in some variations, nodes of certain categories can be visually distinguished from other nodes. Such distinguishing factors could include color, line pattern, and the like.

The architecture solution map can also be interactive in that activation of graphical user interface elements associated with the nodes causes certain actions to occur. For example, activating the graphical user interface elements could cause complementary information and/or links to complementary information to be displayed. The displayed complementary information can also be updated by a user through a user interface made available when such graphical user interface elements are activated.

Computer program products, which may be embodied on computer readable-material, are also described. Such computer program products may include executable instructions that cause a computer system to conduct one or more of the method acts described herein.

Similarly, computer systems are also described that may include a processor and a memory coupled to the processor. The memory may encode one or more programs that cause the processor to perform one or more of the method acts described herein.

The subject matter described herein provides many advantages. For example, tools are described that can be implemented in one or more modes including, but not limited to, building architecture solution maps based on existing IT scenarios, building architecture solution maps based on identified customer requirements, displaying topic dependencies, and proposing learning maps which are useful for implementing solution maps. A self learning application is provided that can record (e.g., via a portal, etc.) other customer's activities and customizations when they are building architecture solution maps so that possible solutions/scenarios can be provided to subsequent users. In addition, by providing pre-defined IT scenarios (or templates) or by specifying a list of different requirements, graphical architecture solution maps can be rendered that illustrate what topics should be included in a deployment and their interrelation (if any). Moreover, such an architecture solution map can be interactive and additionally customized by customers.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 8 illustrates a table characterizing criteria for determining a level of relatedness between two topics.

Like reference symbols in the various drawings indicate like elements.

DETAILED DESCRIPTION

Figures 1, 3:
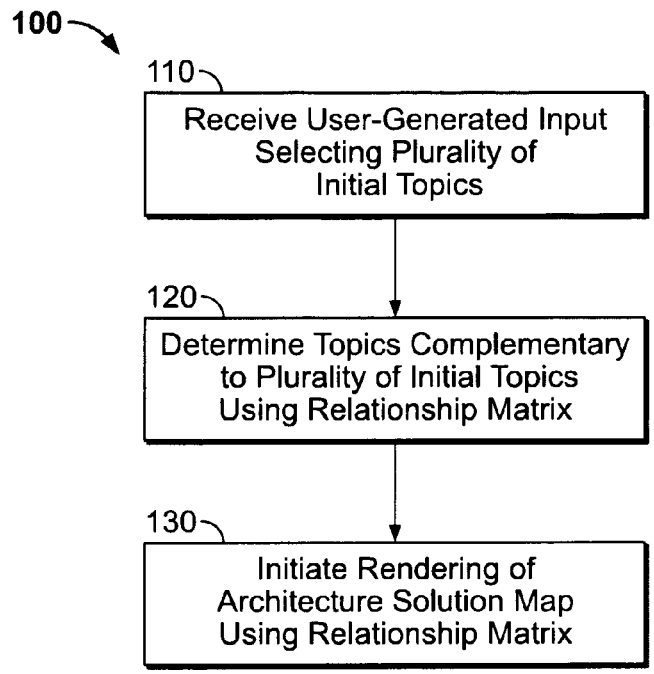
FIG. 1 is a process flow diagram illustrating a method relating to the generating of an architecture solution map.
FIG. 3 illustrates a topic table.

FIG. 1 is a process flow diagram illustrating a method 100 in which, at 110, user-generated input selecting a plurality of initial topics associated with a deployment of a data processing system is received. Thereafter, at 120, topics complementary to the plurality of initial topics using a relationship matrix are determined. The relationship matrix can characterize a level of relatedness among each of at least a portion of the initial topics and the complementary topics. The rendering of an architecture solution map is, at 130, initiated. The architecture solution map provides a visual representation in which each selected topic and each complementary topic having a level of relatedness above a predetermined level are displayed as nodes.

Figure 2:
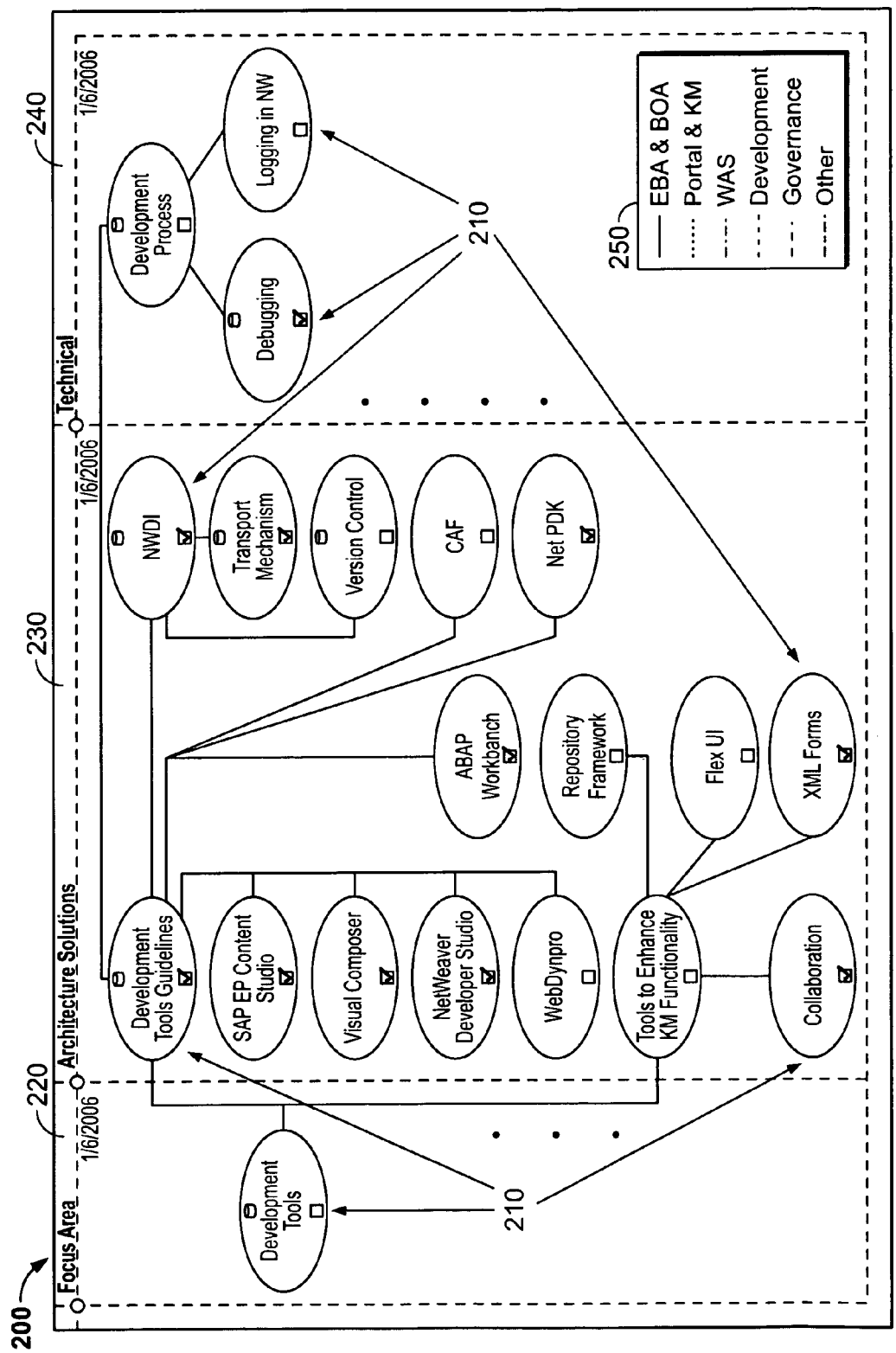
FIG. 2 illustrates an architecture solution map.

FIG. 2 illustrates an architecture solution map 200 which may be implemented in accordance with the subject matter described herein. The architecture solution map 200 comprises a plurality of interconnected nodes 210, each of which represents a topic. Each topic relates to a service, and a composition of different services can be used to create a process. The same service can be consumed by different processes. The architecture solution map 200 represents a number of interrelated processes. In addition, the nodes 210 can be divided into multiple groups such as: General topics 220, Architecture issues 230, and Technical issues 240. Moreover, the architecture solution map 200 may include a legend 250 which characterizes graphical depictions of each of the nodes 210. For example, each node 210 may have a border that is colored according to an application area such as: Process Integration, Portal and Knowledge Management (presentation layer), Development area (tools, processes), Governance, Enterprise Services Architecture and Service Oriented Architecture, and the like. In some variations, a node 210 may have multiple border colors if it belongs to more than one application area (e.g., Enterprise Services Repository node belongs to ESA and Process Integration application areas).

The architecture solution map can be generated and/or utilized in several ways. In one approach referred to as "outside-in", a customer can be provided a list of IT scenarios. Choosing one or more of the IT scenario from the list causes the solution map to be rendered created (including all dependencies between IT scenarios and different topics). A customer can customize solution by adding removing different topics (or nodes in a rendered map). For example, a customer may provide input indicating that it would like to implement "External Facing Portal Solution". By selecting this solution from a list, an architecture solution map with different topics and processes will be created. The customer can then decide that it would like content development and security in its project. The topics content development and security can subsequently be selected from a topic list and will be added with all of their respective dependencies (which may be based, for example, on a level of relatedness). Development tools can be added with sub-topics like Composite Application Framework (CAF), Visual composer, Web Dynpro, and the like. In one implementation, the customer can select iView with Visual composer and remove all remaining topics belonging to Development tools.

In another approach referred to as "inside-out", a customer can choose topics that it desires from a list. Based on these selections, an architecture solution map can be rendered. For example, if the customer indicates that it needs to implement Portal, related topics will be included in the architecture solution map such as Master Data Management (MDM) content, XI messaging infrastructure, and the like.

In a third approach, a customer selects a topic to obtain further information regarding a specific topic and all of its corresponding dependencies. For example, if a customer selects Version Control a project, a resulting architecture solution map can be generated that provides additional information for topics such as NWDI and/or Portal content versioning, Build and transport process, and the like. Such an architecture solution map can, in some variations, only include those topics dependent on the selected topic and not reflect all topics required for a full scale deployment.

Sample topics include, but are not limited to:

Development Tools—For projects and products that require development, this topic characterizes development tools, development languages, etc.

Content management—For deployments utilizing Portal solution, this topic characterizes knowledge management, Business Packages for the Portal, different ways of exposing organizational content.

WAS—This topic characterizes web application servers (WAS) including architecture, JAVA, ABAP stacks, and the like within WAS.

ESA & SOA—This topic characterizes topics relating to an Enterprise Services Architecture such as security, interoperability, business process platform, and the like.

Development Tools Guidelines—This topic characterizes different design-time environments which can be optimized for different users such as J2EE/ABAP/.NET developers, business developers, business analysts or content administrators, and the like. In particular, this topic covers different development tools including positioning and a basic overview of each tool as well as architecture description, comparison and guidelines for integrating development tools with various development/design environments.

NWDI—This topic characterizes the SAP Netweaver development infrastructure for that can reduce development time by providing a consistent environment for an entire software life-cycle.

Transport mechanism—This topic characterizes strategy, methodology and technical details for moving different types of objects from development to test and later to production environments as a part of the development cycle.

Version Control—This topic characterizes strategy, methodology and technical details for managing file/programs versions during development phases. Different scenarios can be described such as distributed teams, local teams, different types of projects, and the like.

Tools to enhance KM functionality—This topic characterizes different tools and possibilities for developing content for knowledge management.

External Facing Portal—This topic characterizes the implementation of an external (.com) Portal that supports website-like behavior and performs well in low-bandwidth networks.

UI Guidelines—This topic characterizes user interface guidelines for different applications such as Portal applications, xApps, knowledge management, and the like. This topic also characterizes how to develop correct user interfaces, how to model user interfaces, and how to implement user interfaces across organizations.

Offline Portal/Applications—This topic characterizes offline Portal solutions that allow mobile users to take their Portal wherever they go and perform transactions when disconnected from the network.

Mobile Engine—This topic characterizes one of the components on top of WAS which enables mobile access to/from different applications. In particular, this topic describes architecture, application solutions (CRM sales/service), mobile application development, and the like.

Global Portal—This topic characterizes different Portal architecture options, and additionally describes solutions for different types of organizations and data exchange between different hubs.

Role Guidelines—This topic characterizes roles and their modeling as one of the building blocks in, for example, the SAP Enterprise Portal field.

WAS Conversion—This topic characterizes issues associated with a convergence towards a standard web application server.

Performance tuning WAS—This topic characterizes issues such as JVM tuning, network traffic optimization, Portal applications, WAS, KM, ITS (Internet transaction server) and the like.

Backup & Restore Guidelines—This topic characterizes issues relating to backup and restore concepts for a distributed system environment. This topic can provide information needed to set up a backup and restore strategy for an implementation of Portal applications, knowledge management, WAS, and the like.

ESR—This topic characterizes an Enterprise Services Repository (ESR) within SAP NetWeaver that allows model-based composition and orchestration of services to enable or enhance business processes.

SAP BPM, XI roadmap and capabilities—This topic characterizes SAP XI (exchange infrastructure), different adapters (in sub topics), BPM (business process management), ARIS, and the like.

NetWeaver Security and interoperability—This topic characterizes security protocols such as SAML, SSL, Kerberous, company security strategy, network security, and the like.

SAML—This topic characterizes security issues which are of particular importance in a service oriented architecture.

Debugging—This topic characterizes issues relating to debugging in SAP Netweaver Developer Studio and other applications.

Logging in NW—The topic characterizes issues relating to logging and tracing concept definition including levels of logging, where to trace and log, who should conduct the tracing and logging, and the like.

Collaboration Rooms Migration—This topic characterizes issues relating to collaboration rooms.

SDN—This topic characterizes how the SAP Development Network operates including issues relating to infrastructure, tips, user interface, development teams, processes, and the like.

xRPM—This topic characterizes SAP xRPM (xApp Resource and Portfolio Management) including connections to different xApps and related components such as BW, WAS, cFolders/cprojects, security, and the like.

SAPJ2EE template—This topic characterizes the creation of configuration templates, upgrade processes, and the like.

XI Monitoring tools—This topic characterizes different levels of monitoring and errors catching such as central monitoring, integration engine monitoring, CCMS, adapter Framework, adapter engine, business process engine monitoring, and the like.

FIG. 3 illustrates a topic table 300 which includes columns for attributes name 310, description 320, focus areas 330, type 340, content 350, comments 360, and state 370. The name attribute 310 can specify a name of the topic. The name can be displayed in a topic node in a corresponding architecture solution map.

The description attribute 320 can specify a short description of the topic. The description can be shown as a tooltip (i.e., a control that provides a small pop-up window with descriptive text, such as a label, for a control or graphic object, etc.) in a corresponding architecture solution map.

The focus area attribute 330 can specify an application area (e.g., XI, MDM, Portal & KM, MI, WAS, etc.) or other main areas (Development, Governance . . . ). The topic node can have border color/shading according to the focus areas to which it belongs.

The type attribute 340 can relate to, for example, general topics, architecture issues, technical issues, and the like. The general topics can include security, Development Tools, ESA, SOA, A2A process Integration, B2B process Integration, and the like. The architecture issues can include NWDI, Version Control, Transport mechanism, Development guidelines, UI guidelines, Role Guidelines, Global Portal strategy, and the like. The technical issues can include Logging, Debugging, Configuring SAPJ2EE, Creating Proxy, Installing Portal, Developing Proxy, Developing Connector, Create Roles, and the like.

The content attribute 350 can specify content related to the topic such as links, documents location, and the like. The content screen will be shown when user activates a graphical user element associated with the node.

The comments attribute 360 can specify comments added by a user for each topic.

The state attribute 370 can allow a user to specify a state such as

Unread, Read, Delete, Very Important Topic, Action Required, and the like.

Figures 4, 6:
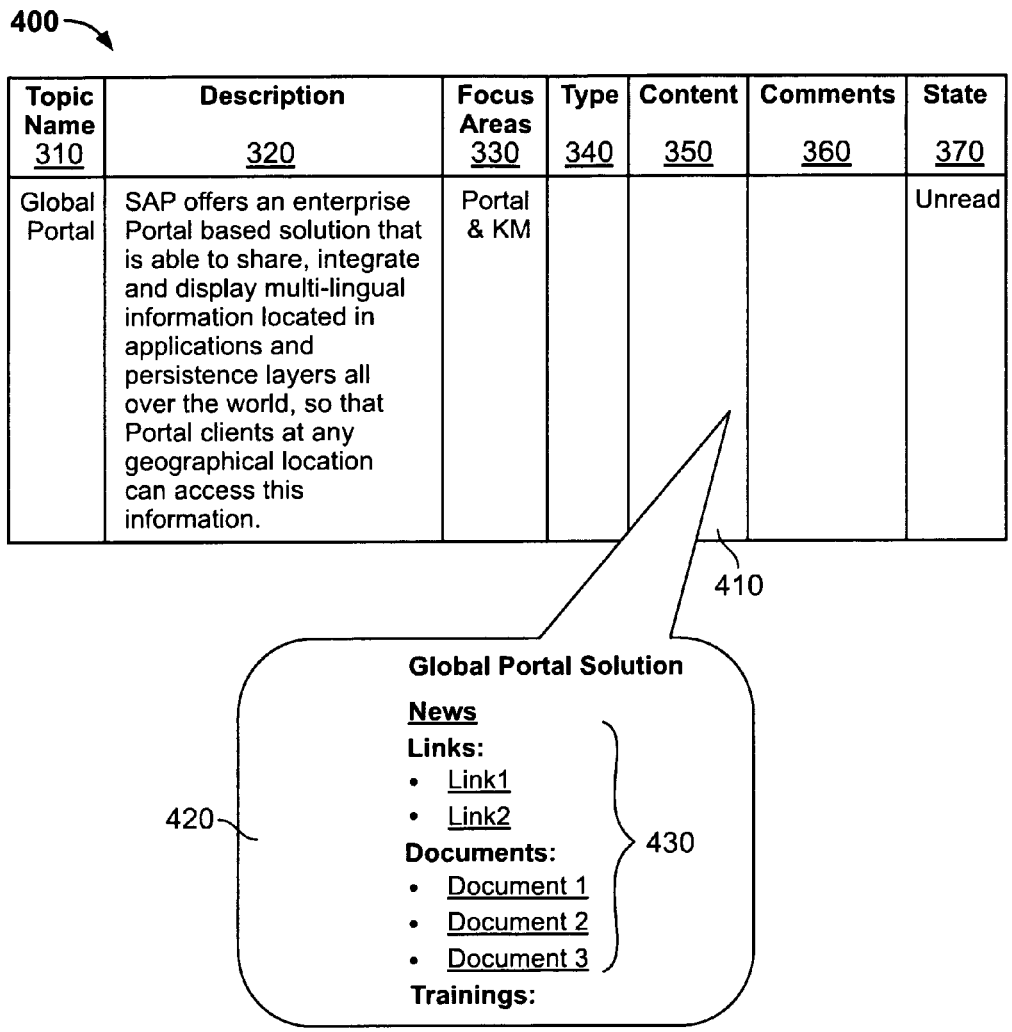
FIG. 4 illustrates a portion of a topic table.
FIG. 6 illustrates a template for a relationship matrix.

In some variations, as illustrated in FIG. 4, a topic table 400 can include one or more graphical user interface elements that cause a dialog window (e.g., tooltip) or other graphic to be displayed when a cursor activates such graphical user interface element. Activation can be any of a variety of techniques such as "clicking" or simply passing the cursor over the graphical user interface element. For example, in FIG. 4, activation of a graphical user interface element in a cell 410 in the content column 350 causes a dialog window 420 (e.g., tooltip) to be presented that includes links 430 information complementary to the topic category such as links to documents, status information, and the like. Movement of the cursor from an area associated with the graphical user interface element may cause the dialog window 420 be closed.

Figure 5:
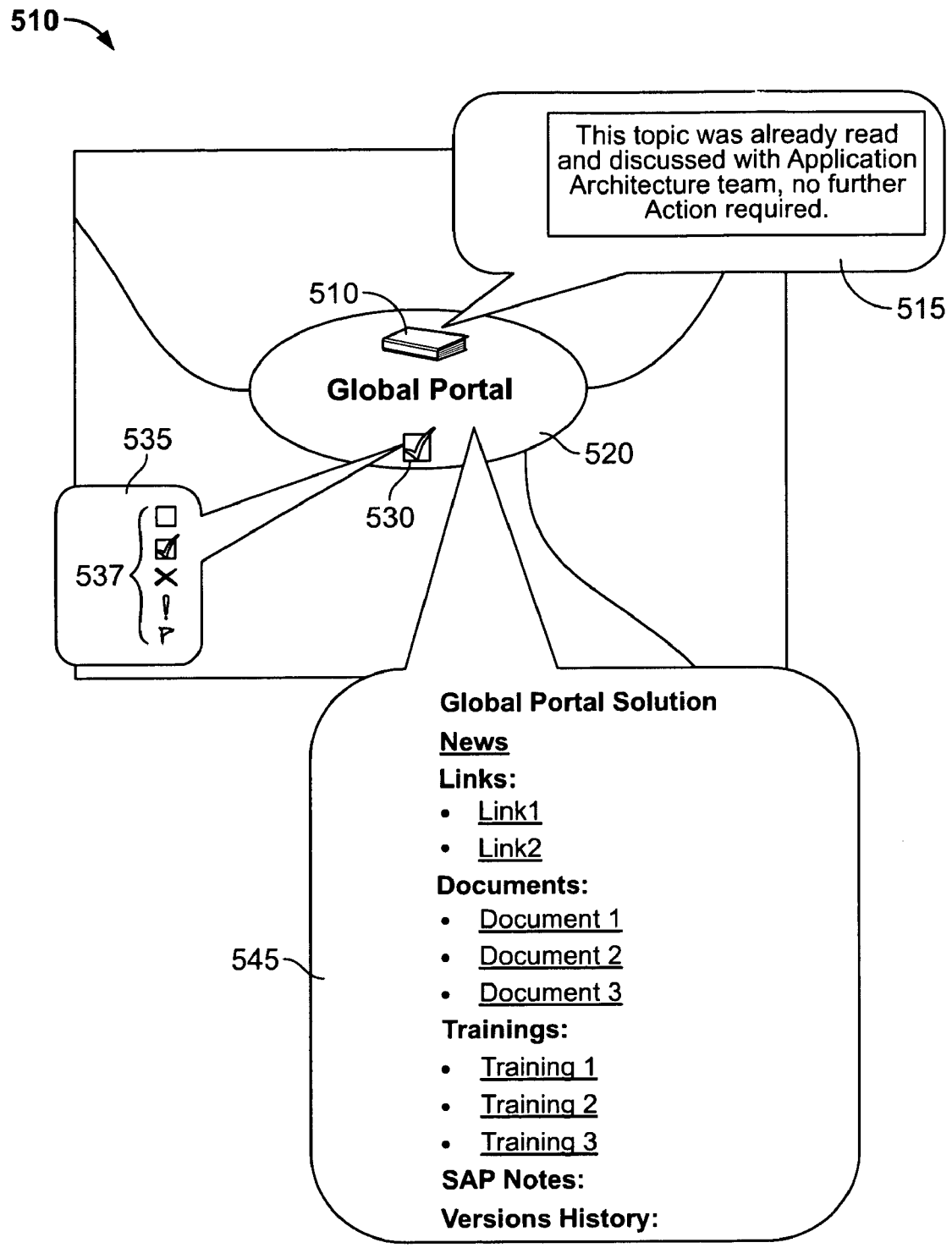
FIG. 5 illustrates a portion of an architecture solution map.

FIG. 5 illustrates a subsection 500 of an architecture solution map that focuses on a single node 510 relating to the topic Global Portal. In this representation, the Global Portal node can include multiple graphical user interface elements 520, 530, 540 that can provide additional information associated with the Global Portal topic when activated. Activation of a first graphical user interface element 520, which may be represented as a notepad, causes a first dialog window 525 to be displayed. The first dialog window 525 can include information or links to information that characterizes a state of review for the associated topic. Activation of a second graphical user interface element 530, which may be represented as a status box, causes a second dialog window 535 to be displayed. The second dialog window 535 can include information characterizing a state and/or priority of the associated topic including additional graphical user interface elements 537 that can be activated to change a displayed state for the node 510. Activation of a third graphical user interface element 540 causes a third dialog window 545 to be displayed. The third dialog window 545 may provide information complementary to the topic and/or links to such information.

Figure 7:
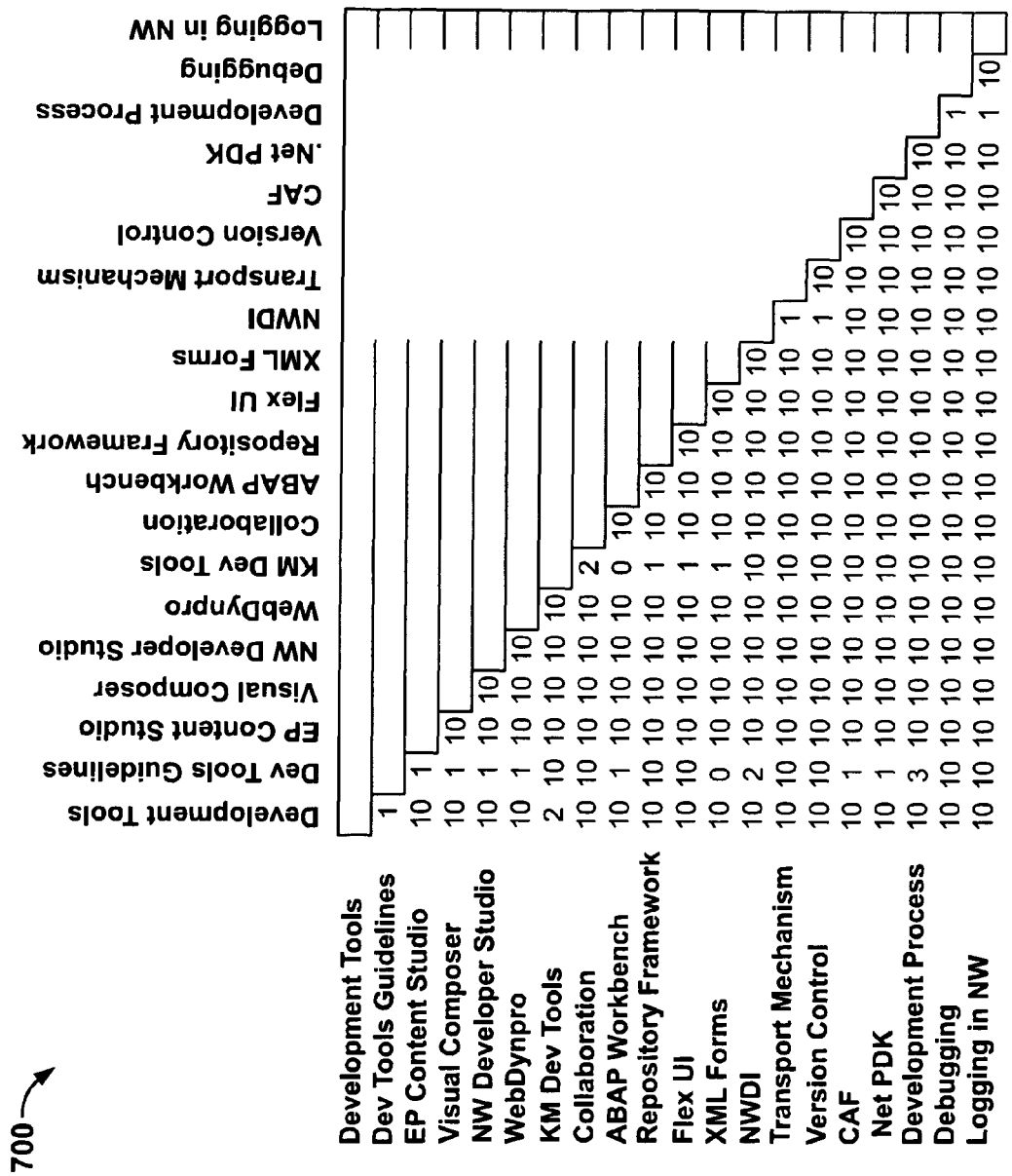
FIG. 7 illustrates a relationship matrix characterizing a level of relatedness among a plurality of topics.

FIG. 6 illustrates a table 600 (a relationship matrix) that characterizes the relationships among the topics. If there is a pool of 200 different topics, the size of the table 600 will be 201×201. The relation of the topics to each other can be represented, for example, by a number from 1 to 10. The designation 1 indicates that the topics are closely related to each other and 10 indicates that the topics are not related. FIG. 7 illustrates a relationship matrix 700 in which the degree of relatedness among a plurality of identified topics are displayed. A relationship matrix can be initially devised, for example, by a group of experienced solution architects once and later modified by each customer when personalizing the map displayed according to their respective needs. Sample criteria for determining relatedness are described in the table 800 illustrated in FIG. 8. It will be appreciated that any range or designations may be utilized in defining a level of relatedness between two topics.

When generating an architecture solution map, a user can define the depth of the solution that will be displayed. For example, a default level of 3 for the relatedness level may be defined. If a user selects level 3 for the architecture solution map, all nodes having a level of 3 or less will be represented (as well as their associated interconnections). Customers can also choose to show the level of relatedness for all the lines connecting the nodes in the final Solution Map (please see image 4)

Users can also personalize/modify a rendered architecture solution map in various ways. For example, a user can add or remove nodes which can result in changes to the corresponding relationship matrix. Content of the nodes can be edited (via, for example, the dialog windows) so that new information is stored in the corresponding topic table. In addition, a user can change the relations of a node (i.e., the connections of nodes on the architecture solution map) which will also result in the relationship matrix being updated. Moreover, a user can import/export topics and/or relationship matrix entries as may be desired.

In one example, an architecture solution map is created in response to user-generated input indicating that it would like to deploy "Tools to enhance KM functionality." One of such tools is a "Repository Framework" and so a node corresponding to this topic is rendered. However, if the user know that its desired solution does not require the "Repository Framework", the associated node can be deleted from the architecture solution map and a corresponding relationship matrix can be updated accordingly.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Moreover, while the foregoing is described in connection with topics and solutions provided by SAP AG, the subject matter described herein can apply to any software deployment that is based on a plurality of topics. Other embodiments may be within the scope of the following claims.

What is claimed is:

1. An article comprising a non-transitory machine-readable medium tangibly embodying instructions that when performed by one or more machines result in operations comprising:

receiving first user-generated input selecting a plurality of initial topics associated with a deployment of a data processing system, each topic relating to a web service for execution between two computing systems within the data processing system, a composition of different services being used to create a process, the same service being able to be consumed by different processes;

determining topics complementary to the plurality of initial topics using a relationship matrix, the relationship matrix characterizing a level of relatedness among each of at least a portion of the initial topics and the complementary topics;

initiating a rendering of an architecture solution map for a plurality of interrelated processes in which each selected topic and each complementary topic having a level of relatedness above a predetermined level are visually displayed as nodes, each node being rendered with a corresponding visual boundary, each visual boundary associated with a single node, the architecture solution map grouping each of the nodes for the selected topics and each complementary topic having a level of relatedness above a predetermined level into a single group and arranging the nodes according to their respective corresponding group; and rendering the architecture solution map to include at least two graphical user interface elements within the corresponding visual boundary for each node, the graphical user interface elements causing, when activated, complementary information corresponding to the topic of the node to be displayed, a first graphical user interface element associated with each node and rendered within the corresponding visual boundary causing a first dialog window to be displayed when activated, the first dialog window including information or links to information that characterizes a state of review for the associated topic, a second graphical user interface element associated with each node and rendered within the corresponding visual boundary causing a second dialog window to be displayed when activated, the second dialog window including information characterizing a state and/or priority of the associated topic;

receiving second user-generated input changing relations of at least one node by activating at least one of the graphical user interface elements positioned on or immediately adjacent to one or more of such at least one node;

modifying the relationship matrix to reflect a change in relations for the at least one node with changed relations; and modifying the rendering of the architecture solution map to reflect the change in relations for the at least one node.

2. An article as in claim 1, further comprising instructions that when performed by one or more machines result in operations comprising: receiving user-generated input selecting the predetermined level of relatedness.

3. An article as in claim 1, further comprising instructions that when performed by one or more machines result in operations comprising:

generating the relationship matrix among a plurality of available topics based on configuration information associated with a plurality of previous processing system deployments, wherein the corresponding level of relatedness among each pair of available topics is based on a plurality of previous processing systems that utilized both topics in a pair.

4. An article as in claim 1, further comprising instructions that when performed by one or more machines result in operations comprising:

generating the relationship matrix among a plurality of available topics based on user-generated configuration information.

5. An article as in claim 1, wherein a graphical representation of the at least some of the nodes is based on one or more categories associated with such nodes, wherein nodes of a first category are visually distinctive from nodes of a second category.

6. An article as in claim 1, wherein the complementary information comprises: one or more links to documents.

7. An article as in claim 1, further comprising:
receiving third user-generated input modifying the complementary information.

8. A computer-implemented method comprising:
receiving first user-generated input selecting a plurality of initial topics associated with a deployment of a data processing system, each topic relating to a web service for execution between two computing systems within the data processing system, a composition of different services being used to create a process, the same service being able to be consumed by different processes;

determining topics complementary to the plurality of initial topics using a relationship matrix, the relationship matrix characterizing a level of relatedness among each of at least a portion of the initial topics and the complementary topics; and initiating a rendering of an architecture solution map for a plurality of interrelated processes in which each selected topic and each complementary topic having a level of relatedness above a predetermined level are visually displayed as nodes and each complementary topic having a level of relatedness below the predetermined level are not visually displayed as nodes, each node being rendered with a corresponding visual boundary, each visual boundary surrounding a corresponding single node, the architecture solution map grouping each of the nodes for the selected topics and each complementary topic having a level of relatedness above a predetermined level into a single group and arranging the nodes according to their respective corresponding group, the architecture solution map including at least two graphical user interface elements within the corresponding visual boundary for each of at least some of the nodes, the graphical user interface elements causing, when activated, complementary information corresponding to the topic of the node to be displayed, a first graphical user interface element associated with each node and rendered within the corresponding visual boundary causing a first dialog window to be displayed when activated, the first dialog window including information or links to information that characterizes a state of review for the associated topic, a second graphical user interface element associated with each node and rendered within the corresponding visual boundary causing a second dialog window to be displayed when activated, the second dialog window including information characterizing a state and/or priority of the associated topic;

receiving second user-generated input changing relations of at least one node by activating at least one of the graphical user interface elements positioned on or immediately adjacent to one or more of such at least one node;

modifying the relationship matrix to reflect a change in relations for the at least one node with changed relations; and modifying the rendering of the architecture solution map to reflect the change in relations for the at least one node.

9. A method as in claim 8, further comprising:
generating the relationship matrix among a plurality of available topics based on configuration information associated with a plurality of previous processing system deployments, wherein the corresponding level of relatedness among each pair of available topics is based on a plurality of previous processing systems that utilized both topics in a pair.

10. A method as in claim 8, further comprising:
generating the relationship matrix among a plurality of available topics based on user-generated configuration information.

11. A method as in claim 8, wherein a graphical representation of the at least some of the nodes is based on one or more categories associated with such nodes.

12. A method as in claim 8, wherein the complementary information comprises: one or more links to documents.

13. A method as in claim 8, further comprising:
receiving third user-generated input modifying the complementary information.

14. An article comprising a non-transitory machine-readable medium tangibly embodying instructions that when performed by one or more machines result in operations comprising:
receiving first user-generated input selecting a plurality of initial topics associated with a deployment of a data processing system, each topic relating to a web service for execution between two computing systems within the data processing system, a composition of different services being used to create a process, the same service being able to be consumed by different processes;

determining topics complementary to the plurality of initial topics using a relationship matrix, the relationship matrix characterizing a level of relatedness among each of at least a portion of the initial topics and the complementary topics;

rendering an architecture solution map for deploying the data processing system in which each selected topic and each complementary topic having a level of relatedness above a predetermined level are visually displayed as linked nodes, each node being rendered with a corresponding visual boundary, each visual boundary surrounding a single node, the data processing system comprising a plurality of interrelated processes, the nodes being arranged into vertical sections of groups of related nodes in which at least one node in each section is linked to a node in another section, the nodes having associated graphical user interface elements positioned on or immediately adjacent to the corresponding visual boundary of the corresponding node, a first graphical user interface element associated with each node and rendered within the corresponding visual boundary as a notepad graphical element causing a first dialog window to be displayed when activated, the first dialog window including information or links to information that characterizes a state of review for the associated topic, a second graphical user interface element associated with each node and rendered within the corresponding visual boundary as a status box element causing a second dialog window to be displayed when activated, the second dialog window including information characterizing a state and/or priority of the associated topic;

receiving second user-generated input selecting at least one graphical user interface element; and modifying the rendering of the architecture solution map to remove nodes associated with the selected at least one graphical user interface elements:

receiving third user-generated input changing relations of at least one node by activating at least one of the graphical user interface elements positioned on or immediately adjacent to one or more of such at least one node;

modifying the relationship matrix to reflect a change in relations for the at least one node with changed relations; and modifying the rendering of the architecture solution map to reflect the change in relations for the at least one node.

* * * * *